United States Patent [19]

Masaki et al.

[11] 4,433,666
[45] Feb. 28, 1984

[54] EXHAUST GAS RECIRCULATION SYSTEM FOR DIESEL ENGINE

[75] Inventors: Kenji Masaki, Yokohama; Seishi Yasuhara, Yokosuka, both of Japan

[73] Assignee: Nissan Motor Co., Limited, Yokohama, Japan

[21] Appl. No.: 365,589

[22] Filed: Apr. 5, 1982

[30] Foreign Application Priority Data

Apr. 7, 1981 [JP] Japan .................... 56-51984

[51] Int. Cl.³ .................................. F02M 25/06
[52] U.S. Cl. ......................... 123/569; 123/571; 180/309
[58] Field of Search ............. 180/309, 569, 568, 571

[56] References Cited

U.S. PATENT DOCUMENTS

| | | | |
|---|---|---|---|
| 4,181,944 | 1/1977 | Yamauchi et al. | |
| 4,185,604 | 1/1980 | Nagaishi et al. | 123/571 |
| 4,233,947 | 11/1980 | Abo | 123/571 |
| 4,279,235 | 7/1981 | Flaig et al. | 123/569 |
| 4,280,471 | 7/1981 | Masaki et al. | 123/571 |
| 4,281,631 | 8/1981 | Yamaguchi | 123/571 |
| 4,333,438 | 6/1982 | Perez et al. | 123/569 |
| 4,333,440 | 6/1982 | Eheim | 123/569 |
| 4,375,800 | 3/1983 | Otsuka et al. | 123/569 |

*Primary Examiner*—Wendell E. Burns
*Attorney, Agent, or Firm*—Schwartz, Jeffery, Schwaab, Mack, Blumenthal & Koch

[57] ABSTRACT

An exhaust gas recirculation control system calculates a target EGR ratio value based upon engine operating parameters and maintains the EGR ratio at the target EGR ratio value. Each time the vehicle travels a predetermined distance, the control system calculates an actual EGR ratio value and corrects the target EGR ratio value to reduce a deviation between the target and actual EGR ratio values to zero.

12 Claims, 6 Drawing Figures

EXHAUST GAS RECIRCULATION SYSTEM FOR DIESEL ENGINE

BACKGROUND OF THE INVENTION

This invention relates to an exhaust gas recirculation (EGR) system for use in a diesel engine for recirculating a controlled rate of exhaust gases to the engine and, more particularly, to such an EGR system employing an electronic control unit adapted to calculate a target EGR ratio based upon engine operating parameters for controlling the rate of exhaust gases recirculated to the engine so as to obtain the calculated target EGR ratio.

In order to minimize emission of noxious pollutants discharged from a diesel engine to the atmosphere, it is the current practice to suppress combustion by recirculating a controlled rate of exhaust gases to the engine through an EGR passage having therein an EGR valve and connecting the engine exhaust passage to the engine intake passage downstream of the throttle valve. The rate of exhaust gases recirculated to the engine, which has a significant effect on both emission of nitrogen oxides and production of carbon fine particles, is determinative on not only the position of the EGR valve but also the position of the throttle valve across which a pressure differential exists in aid of introducing exhaust gases into the intake passage from the EGR passage. For example, the rate of exhaust gas flow through the EGR passage increases as the EGR valve moves in an opening direction for the same throttle valve position or as the throttle valve moves in a closing direction for the same EGR valve position. The position of the throttle valve, which also determines the rate of air flow to the engine, should be controlled properly to maintain optimum engine output performance in accordance with engine operating conditions.

Exhaust gas recirculation (EGR) control systems are well-known which involve an electronic control unit for providing accurate EGR ratio open-loop control. Such an electronic control unit calculates a target value for the EGR ratio meeting with requirements relating to engine output and exhaust performances as close as possible based upon engine operating parameters such as engine speed, accelerator pedal depression (indicated by fuel injection pump control sleeve or control rack position), fuel injection timing, engine coolant temperature, engine oil temperature, and the like and controls the EGR valve and throttle valve positions to obtain the calculated target EGR ratio. Such EGR ratio open-loop control has the distinct advantage in extremely fast response to engine operating condition changes.

In case where a deviation occurs between the calculated target EGR ratio value and the actual EGR ratio requirement due to errors in measurement in making and assembling engine parts such as the EGR valve and the throttle valve, changes in the engine part characteristics with the passage of time caused by mechanical wear and accumulated carbons on the engine parts, and the like, however, the EGR open-loop control system cannot correct the target EGR ratio value for the deviation. In addition, with an emission control device such as a soot collector located in the engine exhaust system for purifying engine exhaust emissions, the EGR open-loop control system cannot provide accurate EGR ratio control due to exhaust pressure changes caused by soot collected in the emission control device.

The present invention provides an improved and novel exhaust gas recirculation control system which open-loop controls the EGR ratio in accordance with a target EGR ratio value calculated based upon engine operating parameters and which, each time the vehicle travels a predetermined distance, calculates an actual EGR ratio value based upon measurements of the rate of air flow to the engine and the rate of exhaust gases recirculated to the engine and corrects the calculated target EGR ratio value for the deviation between the actual and target EGR ratio values, thereby eliminating the limitations and drawbacks inherent in previous EGR open-loop control systems.

SUMMARY OF THE INVENTION

The present invention provides an EGR control system for use in an automotive vehicle having a diesel engine including an intake passage provided therein with a throttle valve for controlling the rate of air flow to the engine, an exhaust passage, an EGR passage connected at its one end to the exhaust passage and at the other end to the intake passage downstream of the throttle valve, and the EGR passage having therein an EGR valve for controlling the rate of recirculated exhaust gas flow through the EGR passage. The EGR control system comprises a first sensor adapted to generate an output signal indicative of the rate of recirculated exhaust gas flow through the EGR passage, a second sensor adapted to generate a check signal each time the vehicle travels a predetermined distance, a third sensor adapted to generate an output signal indicative of the rate of air flow to the engine, and a control unit calculating a target value for the EGR ratio based upon engine operating parameters and controlling the EGR valve to maintain the EGR ratio at the calculated target value. The control unit responds to the check signal from the second sensor for calculating an actual value for the EGR ratio based upon the output signals from the first and third sensors and correcting the calculated target EGR ratio value for the calculated actual EGR ratio value, thereby reducing a deviation between the target and actual EGR ratio values to zero.

The first sensor may comprise a bypass passage connected at its inlet and outlet ends to the EGR passage at different positions and provided therein with a venturi section, a pair of change-over valves provided respectively at the bypass passage inlet and outlet ends, and a pressure differential transducer adapted to generate an output signal indicative of the pressure differential existing across the venturi section. The change-over valves are movable between a first position separating the bypass passage from the EGR passage and a second position permitting substantially the whole amount of recirculated exhaust gases to flow through the bypass passage. A device is provided which changes the change-over valve position from the first position to the second position in response to a check signal from the second sensor.

The control unit may be designed to calculate a correction factor by dividing the calculated actual EGR ratio value by the calculated target EGR ratio value and correct the calculated target EGR ratio value by multiplying the calculated correction factor by the calculated target EGR ratio value.

Alternatively, the control unit may be designed to correct the target EGR ratio value by multiplying the target EGR ratio value by a result of repetitively subtracting a predetermined value from a predetermined correction factor when the target EGR ratio value is smaller than the actual EGR ratio value or a result of repetitively adding the predetermined value from the predetermined correction factor when the target EGR ratio value is greater than the actual EGR ratio value until the target EGR ratio value agrees with the actual EGR ratio value.

BRIEF DESCRIPTION OF THE DRAWINGS

The details as well as other features and advantages of this invention are set forth below and are shown in the accompanying drawings, in which.

DETAILED DESCRIPTION OF THE PREFERRED EMBODIMENTS

Figure 1:
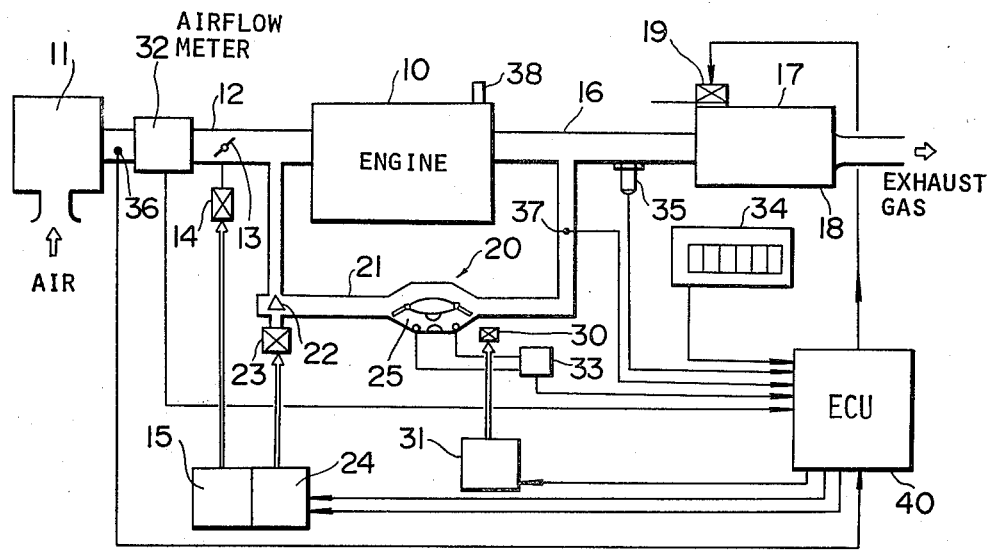
FIG. 1 is a schematic block diagram showing one embodiment of an exhaust gas recirculating control system made in accordance with the present invention.
Figure 2:
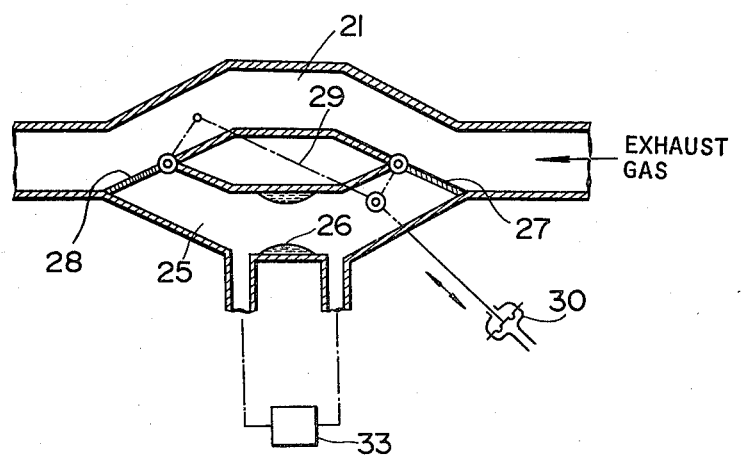
FIG. 2 is a fragmentary enlarged sectional view showing a bypass passage connected in parallel with the EGR passage.

Referring particularly to FIGS. 1 and 2 of the drawings, air to a diesel engine 10 is supplied through an air cleaner 11 and an intake passage 12 leading to the diesel engine. A throttle valve 13 is disposed within the intake passage 12 to control the air flow through the intake passage. The position of the throttle valve 13 is varied by a pneumatic valve actuator 14 which responds to a vacuum introduced thereinto from a vacuum modulator 15. The vacuum modulator 15 adjusts the degree of the vacuum introduced into the pneumatic valve actuator 14 in response to a command signal from a microprocessor-based electronic control unit to be hereinafter described. Exhaust gases from the engine 10 are discharged through an exhaust passage 16 to the atmosphere. The exhaust passage 16 has therein an emission control device 17 for purifying exhaust gases to be discharged into the atmosphere. The emission control device 17 shown is a soot collector having a combustion chamber 18 and an ignitor or a burner 19 which may be actuated to burn the soot collected in the combustion chamber 18 when the vehicle runs a predetermined distance or when the pressure in the exhaust passage reaches a predetermined value. The pressure in the exhaust passage increases in the amount of the soot collected in the soot collector. It is to be noted that the emission control device 17 may be other exhaust gas purifiers such as a conventional catalytic converter and the like.

The engine 10 is also associated with an exhaust gas recirculation system (EGR) 20 including an EGR passage 21. The EGR passage 21 opens at its one end into the exhaust passage 16 upstream of the emission control device 17 and at the other end into the intake passage 12 downstream of the throttle valve 13 to recirculate exhaust gases into the engine 10. The EGR passage 21 has therein an EGR valve 22 to control the exhaust gas flow through the EGR passage 21. The position of the EGR valve 22 is varied by a pneumatic valve actuator 23 which responds to a vacuum introduced thereinto from a vacuum modulator 24. The vacuum modulator 15 adjusts the degree of the vacuum introduced into the pneumatic valve actuator 23 in response to a command signal from the electronic control unit to be hereinafter described.

Connected in parallel with the EGR passage 21 is a bypass passage 25 with its inlet and outlet ends opened into the EGR passage 21 at different positions. The bypass passage 25 includes a venturi section 26 which produces thereacross a pressure differential used to determine the rate of exhaust gas flow through the bypass passage 25. Two change-over valves 27 and 28 are respectively provided at the inlet and outlet ends of the bypass passage 25. The position of the change-over valves 27 and 28 is changed between first and second positions through a link mechanism 29 by a pneumatic valve actuator 30 which responds to a vacuum introduced thereinto from a vacuum modulator 31. The vacuum modulator 31 adjusts the degree of the vacuum introduced into the pneumatic valve actuator 30 in response to a command signal from the electronic control unit to be described later. At the first position, as shown in FIGS. 1 and 2, the change-over valves 27 and 28 respectively close the inlet and outlet ends of the bypass passage 25 to prevent exhaust gases from entering into the bypass passage 25 so as to minimize soot collection on and around the venturi section 26. At the second position, they open the bypass passage inlet and outlet ends and close a part of the EGR passage 21 to permit the whole amount of recirculated exhaust gases to flow through the bypass passage 25.

Various sensors, detectors, etc. are positioned at various locations with respect to the engine 10 and are used to measure or sense various engine operating parameters such as engine speed, accelerator pedal depression, the rate of air flow to the engine, vehicle travelling distance, recirculated exhaust gas flow rate, exhaust manifold pressure, air temperature, exhaust gas temperature, and the like. An airflow meter 32 is located in the intake passage 12 upstream of the throttle valve 13. The airflow meter 32 senses the rate of air flow through the intake passage 12 and generates an output signal indicative of the rate of air flow to the engine 10. A pressure differential transducer 33 is located in the bypass passage 25, which senses the pressure differential existing across the venturi section 26 of the bypass passage 25 and generates an output signal indicative of the pressure differential existing across the bypass passage venturi section 26. The pressure differential transducer 33 may be replaced by a pressure transducer which senses the vacuum existing at the throat portion of the venturi section 26 and generates an output signal indicative of the vacuum existing at the venturi section throat portion. A travelling distance sensor 34 is provided for generating a check signal each time the vehicle travels a predetermined distance. The travelling distance sensor 34 may comprise a switch associated with an odometer to actuate each time the odometer counting wheel representing the hundreds digit rotates a turn; that is, each time the vehicle travels 1,000 kilometers. A pressure transducer 35 is located in the exhaust passage somewhere upstream of the emission control device 17. The pressure transducer 35 senses the pressure existing within the exhaust passage 16 and generates an output signal indicative of the exhaust gas pressure existing within the exhaust passage. An air temperature sensor 36 is located in the intake passage 12 somewhere upstream of the throttle valve 13. The air temperature sensor 36 generates an output signal proportional to the ambient air temperature existing in the intake passage upstream of the throttle valve. An exhaust gas temperature sensor 37 is preferably located in the EGR passage 21 for generating an output signal proportional to the exhaust gas temperature existing in the EGR passage 21. An engine speed sensor 38 is provided for generating an output signal proportional to the speed of rotation of the engine 10.

Signals indicative of these actual engine operating parameters are supplied to the microprocessor-based electronic control unit (ECU) 40 including a digital computer which shall be regarded as including an analog multiplexer, an analog-to-digital converter, a central processing unit, a memory, a clock oscillator, and the like. The electronic control unit 40 calculates the optimal controlled variables, e.g., the EGR ratio, the EGR-valve position, the throttle-valve position, etc. The microprocessor-based electronic control unit 40 utilizes programs and tables of optimal values stored in memory for optimizing the selection and adjustment of the controlled variables to obtain optimal engine performance under all operating conditions.

The electronic control unit 40 repetitively calculates target values Eo for the EGR ratio based upon at least one of the second engine operating parameters and calculates values corresponding to the settings of the controlled-variable EGR-valve position and throttle-valve position to provide an appropriate EGR ratio corresponding to the calculated target value Eo so as to effectively reduce nitrogen oxides without increasing hydrocarbons and carbons. The electronic control unit 40 generates command signals indicative of the calculated values of the settings of the EGR-valve position and the throttle-valve position. The command signals are applied respectively to the vacuum modulators 24 and 15 which thereby adjust the degree of vacuum introduced into the respective pneumatic valve actuators 23 and 14 so that the positions of the EGR and throttle valves 22 and 13 are controlled to obtain an optimal EGR ratio corresponding to the calculated target value Eo.

Figure 3A:
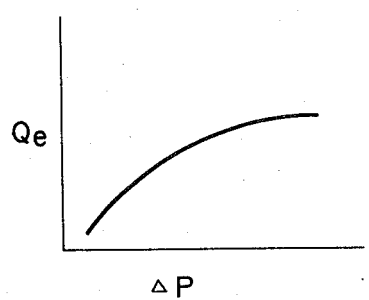
FIGS. 3A and 3B are graphs of pressure differential across the bypass passage venturi section versus the rate of recirculated exhaust gas flow through the EGR passage.
Figure 3B:
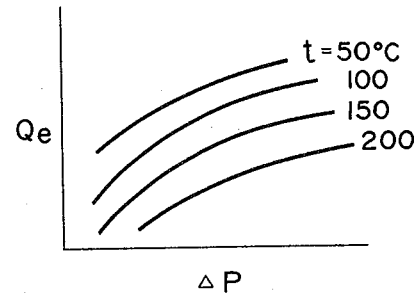

Each time the vehicle travels a predetermined distance, a check signal is supplied from the travelling distance sensor 34 to the electronic control unit 40 which thereby provides a command signal to the vacuum modulator 31, causing the pneumatic valve actuator 30 to shift the change-over valves 27 and 28 from its first position to its second position permitting the whole amount of recirculated exhaust gases to flow through the bypass passage 25. The pressure differential transducer 33 provides an output signal indicative of the pressure differential existing across the venturi section 26 to the electronic control unit 40 which calculates a value for the rate of recirculated exhaust gas flow through the bypass passage 25 based upon the sensed pressure differential. While the recirculated exhaust gas flow rate may be arithmetically calculated based upon the sensed pressure differential across the venturi section 26, the effective diameter of the venturi section, and the like, it is convenient to calculate it by a table look-up technique utilizing data which identify values for the recirculated exhaust gas flow rate Qe as a function of pressure differential $\Delta P$ across the bypass passage venturi section 26, as shown in FIG. 3A. It is preferable to correct the calculated recirculated exhaust gas flow rate value for the temperature of the exhaust gases recirculated through the EGR passage 21. For this purpose, the output of the exhaust gas temperature sensor 37 is coupled to the electronic control unit 40 which selects values from data in look-up table which identify values for the recirculated exhaust gas flow rate Qe as functions of pressure differential $\Delta P$ across the bypass passage venturi section 26 and recirculated exhaust gas temperature, as shown in FIG. 3B.

The electronic control unit 40 further calculates an actual EGR ratio value E based upon the recirculated exhaust gas flow rate Qe and the sensed air flow rate Qa and calculates a correction factor K by dividing the calculated target EGR ratio value Eo by the calculated actual EGR ratio value E. If there is no deviation between the target and actual EGR ratio values Eo and E, the correction factor will be equal to 1. Otherwise, the correction factor K will be smaller or greater than 1. In the presence of a check signal from the travelling distance sensor 34, the electronic control unit 40 corrects the calculated target EGR ratio value Eo for the calculated correction factor K to provide a new target EGR ratio value E' which is a result of multiplying the calculated target EGR ratio value Eo by the calculated correction factor K so as to reduce the devatiation between the target and actual EGR ratio values Eo and E to zero.

Figure 4:
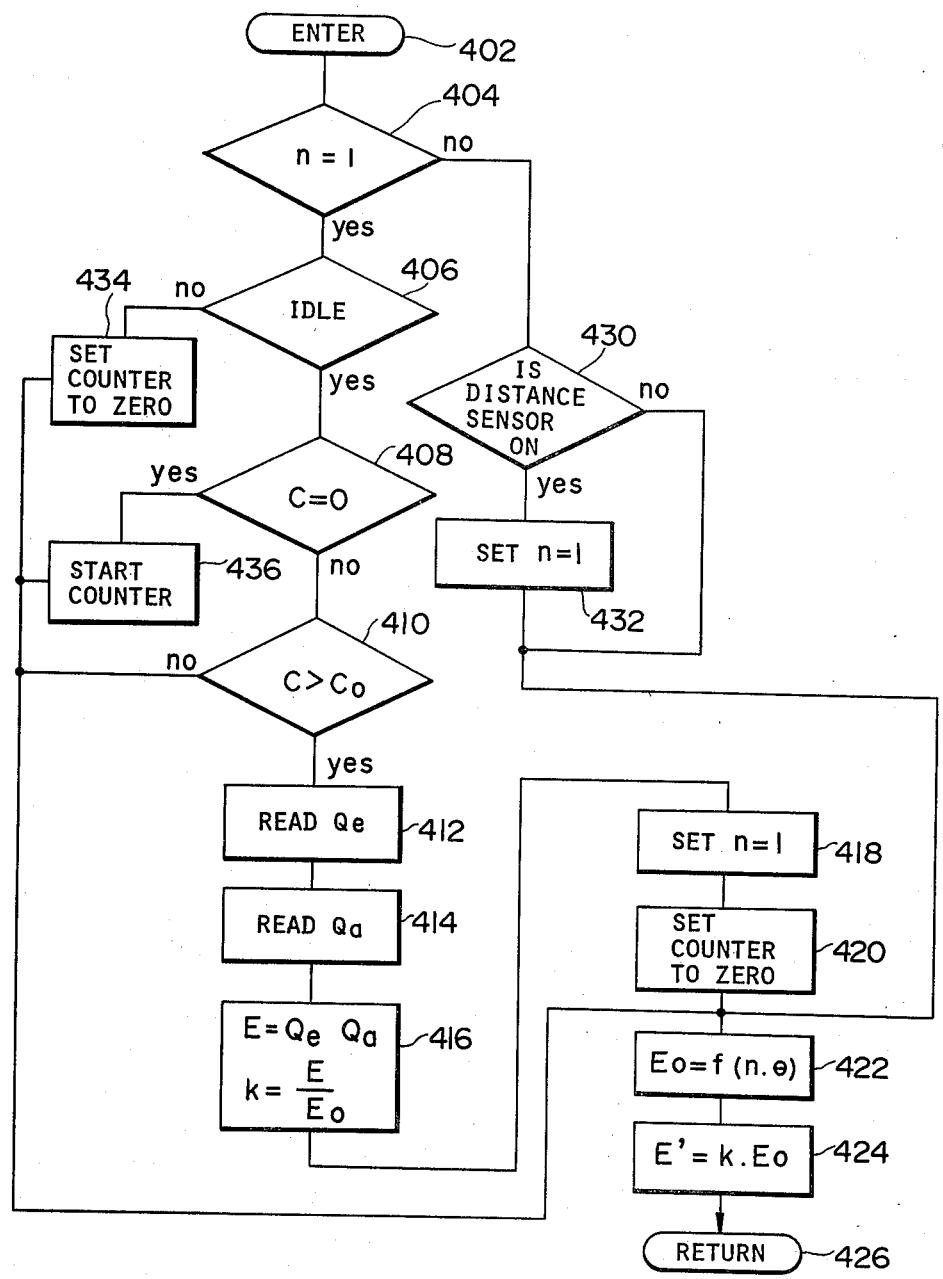
FIG. 4 is a flow diagram illustrating the programming of the digital computer as it is used to control the EGR ratio in the engine.

Referring to FIG. 4, the operation of the electronic control unit 40 will be described further. The computer program is entered at point 402. At point 404 in the program, the digital computer makes a determination as to whether the computer ward n is equal to 1 which indicates that the travelling distance sensor 34 generates a check signal. If the answer to this question is yes, then at point 406, another determination is made as to whether or not the engine is idling. If the engine is idling, then the program proceeds through the yes line to a determination step at point 408 as to whether or not the value C of the count in a counter is zero. The counter starts counting clock pulses, increasing its count value when the engine is found to be idling to be hereinafter described. If the determination at point 408 is no, then at point 410 another determination is made as to whether or not the count value C is greater than a reference value Co. If the answer to this question is yes, it means that the engine idle condition continues over a predetermined time and the program proceeds to a point 412 wherein the digital computer reads a value Qe for the rate of exhaust gas flow through the bypass passage 25 into the computer memory. At point 414, the digital computer reads a value Qa for the rate of air flow to the engine into the computer memory. At point 416 in the program, the digital computer calculates a value E for the actual EGR ratio by dividing the read exhaust gas flow rate value Qe by the read air flow rate value Qa and also calculates a correction factor K by dividing the calculated actual EGR ratio value E by the calculated target EGR ratio value Eo.

Following this, the computer ward n is set at point 418 to zero and then the counter value C is set at point 420 to zero. At point 422 in the program, the target EGR ratio value Eo is calculated based upon engine operating parameters. At point 424, the digital computer corrects the target EGR ratio value JEo for the correction factor K by multiplying the former by the latter and outputs the corrected target EGR ratio value E'. The program proceeds to a point 426 which returns the program to the beginning at point 402.

The steps at points 406, 408 and 410 are for the purpose of permitting calculations for the actual EGR ratio E and the correction factor K only during engine idle conditions, but avoiding these calculations just after the engine is rapidly accelerating or the vehicle is climbing through steep slopes.

If the answer to the question at point 404 is no, then the program proceeds to a determination step at point 430 as to whether or not the travelling distance sensor is turned on. If the answer to this question is yes, the computer ward n is set at point 432 to 1 and the program proceeds to the step at point 422. Otherwise, the program proceeds directly to the step at point 422.

If the answer to the question at point 406 is no, then the counter count C is set at point 434 to zero and the program proceeds to the step at point 422. If the answer to the question at point 408 is yes, then at point 436, the counter starts counting clock pulses and then the program proceeds to the step at point 422.

In order to reduce a deviation between the target and actual EGR ratio values Eo and E to zero, the electronic control unit 40 corrects the target EGR ratio value by multiplying the target EGR value by a correction factor K which is a result of dividing the actual EGR ratio value by the target EGR ratio value. Alternatively, the electronic control unit 40 may be designed to correct the target EGR ratio value Eo by multiplying the target EGR ratio value JEo by a result of repetitively subtracting a predetermined value from a predetermined correction factor K when the target EGR ratio value is smaller than the actual EGR ratio value or a result of repetitively adding the predetermined value from the predetermined correction factor when the target EGR ratio value is greater than the actual EGR ratio value until the target EGR ratio value agrees with the actual EGR ratio in FIG. 5.

Figure 5:
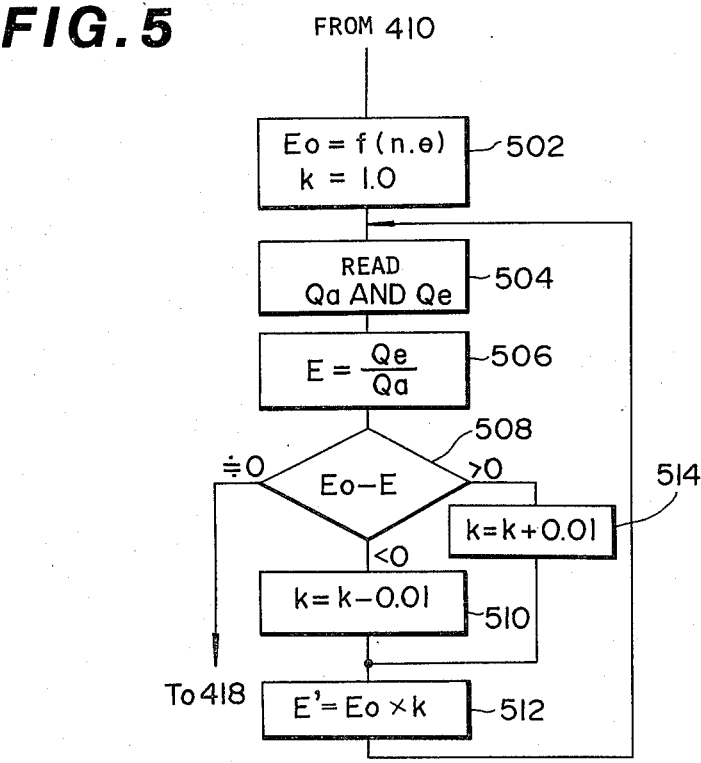
FIG. 5 is a flow diagram illustrating another form of the programming of the digital computer as it is used to control the EGR ratio in the engine.

FIG. 5 is a flow diagram illustrating a part of the programming of the digital computer which is substantially the same as shown in FIG. 4 except that the steps at points 412–416 are eliminated and replaced with steps at points 502–514. If the answer to the question at point 410 is yes, it means that the idle condition continues over a predetermined time and the computer program proceeds to a point 502 wherein a target EGR ratio value Eo is calculated based upon selected engine operating parameters and the correction factor K is set to a predetermined value, for example, 1. At point 504 in the program, the digital computer reads values Qa and Qe for the rate of air flow to the engine into the computer memory. At point 506, the digital computer calculates an actual EGR ratio value E by dividing the read value Qe by the read value Qa. Following this, the program proceeds to a determination step at point 508 as to whether or not the calculated target EGR ratio value Eo is equal to the actual EGR ratio value E. If the former is smaller than the latter, it means that the rate of exhaust gases recirculated to the engine is greater than the actual requirement and the program proceeds to a point 510 wherein the digital computer calculates a new correction factor by subtracting a predetermined value, for example, 0.01 from the correction factor K which has been set at point 502 to 1. At point 512 in the program, the target EGR ratio value Eo is corrected for the calculated new correction factor by multiplying the target EGR ratio value Eo by the new correction factor and the corrected target EGR ratio value is outputted. Following this, the program is returned to the step at point 504.

If the target EGR ratio value Eo is greater than the actual EGR ratio value E at point 508, it means that the rate of exhaust gases recirculated to the engine is smaller than the actual requirement and the program proceeds to a point 514 wherein the digital computer calculates a new correction factor by adding the predetermined value (0.01) to the correction factor K. Subsequently, the program proceeds to the step at point 512. If the target EGR ratio value Eo is equal to the actual EGR ratio value E at point 508, then the program proceeds to the step at point 418.

The exhaust gas recirculation control system of the present invention open-loop controls the EGR ratio in accordance with a target EGR ratio value calculated based upon one engine operating parameters for extremely fast response to engine operating condition changes. The invention also achieves significantly accurate EGR ratio control by correcting the calculated target EGR ratio value, each time the vehicle travels a predetermined distance, so as to reduce a deviation between the target and actual EGR ratio values to zero. In the absence of the check signal, the pneumatic valve actuator 30 retains the change-over valves 27 and 28 at the first position to prevent recirculated exhaust gases from entering into the bypass passage 25 so as to minimize soot collection on and around the bypass passage venturi section 26. In case where the rate of recirculated exhaust gas flow through the bypass passage is measurd only when the engine is idling, the rate of air flow to the engine is determined as a function of engine speed and the actual EGR ratio value may be calculated based upon engine speed and recirculated exhaust gas flow rate.

While the present invention has been described in conjunction with specific embodiments thereof, it is evident that many alternatives, modifications and variations will be apparent to those skilled in the art. Accordingly, it is intended to embrace all alternatives, modifications and variations that fall within the spirit and broad scope of the appended claims.

What is claimed is:

1. In an automotive vehicle having a diesel engine including an intake passage provided therein with a throttle valve for controlling the rate of air flow to said engine, an exhaust passage, an EGR passage connected at its one end to said exhaust passage and at the other end to said intake passage downstream of said throttle valve, said EGR passage having therein an EGR valve for controlling the rate of exhaust gas flow recirculated through said EGR passage, an EGR control system comprising:
    (a) a first sensor adapted to generate an output signal indicative of the rate of recirculated exhaust gas flow through said EGR passage;
    (b) a second sensor adapted to generate a check signal each time said vehicle travels a predetermined distance;
    (c) a third sensor adapted to generate an output signal indicative of the rate of air flow to said engine; and
    (d) a control unit calculating a target value for the EGR ratio based upon engine operating parameters and controlling said EGR valve to maintain the EGR ratio at the calculated target value, said control unit, responsive to the check signal from said second sensor, for calculating an actual value for the EGR ratio based upon the output signals from said first and third sensors and correcting the calculated target EGR ratio value or the calculated actual EGR ratio value, thereby reducing a deviation between the target and actual EGR ratio values to zero.

2. In an automotive vehicle having a diesel engine including an intake passage provided therein with a throttle valve for controlling the rate of air flow to said engine, an exhaust passage provided theein with an emission control device, an EGR passage connected at its one end to said exhaust passage upstream of said emission control device and at the other end to said intake passage downstream of said throttle valve, said EGR passage having therein an EGR valve for controlling the rate of recirculated exhaust gas flow through said EGR passage, an EGR control system comprising:
 (a) a first sensor adapted to generate an output signal indicative of the rate of recirculated exhaust gas flow through said EGR passage;
 (b) a second sensor adapted to generate a check signal each time said vehicle travels a predetermined distance;
 (c) a third sensor adapted to generate an output signal indicative of the rate of air flow to said engine; and
 (d) a control unit calculating a target value for the EGR ratio based upon engine operating parameters and controlling said EGR valve to maintain the EGR ratio at the calculated target value, said control unit, responsive to the check signal from said second sensor, for calculating an actual value for the EGR ratio based upon the output signal from said first and third sensors and correcting the calculated target EGR ratio value for the calculated actual EGR ratio value, thereby reducing a deviation between the target and actual EGR ratio values caused by exhaust gas pressure changes to zero.

3. The EGR control system of claim 1 or 2, wherein said control unit calculates the actual EGR ratio value and corrects the calculated target EGR ratio value for the calculated actual EGR ratio valve during engine idling in the presence of the check signal from said second sensor.

4. The EGR control system of claim 3, wherein said control unit calculates the actual EGR ratio value and corrects the calculated target EGR ratio value for the calculated actual EGR ratio value when engine idling continues over a predetermined time.

5. The EGR control system of claim 1 or 2, wherein said third sensor is an airflow meter provided in said intake passage upstream of said throttle valve for sensing the rate of air flow to said engine and generating an output signal proportional to the sensed air flow rate.

6. In an automotive vehicle having a diesel engine including an intake passage provided therein with a throttle valve for controlling the rate of air flow to said engine, an exhaust passage, an EGR passage connected at its one end to said exhaust passage and at the other end to said intake passage downstream of said throttle valve, said EGR passage having therein an EGR valve for controlling the rate of exhaust gas flow recirculated through said EGR passage, an EGR control system comprising:
 (a) a first sensor adapted to generate an output signal indicative of the rate of recirculated exhaust gas flow through said EGR passage;
 (b) a second sensor adapted to generate a check signal each time said vehicle travels a predetermined distance;
 (c) a third sensor adapted to generate an output signal indicative of the speed of rotation of said engine; and
 (d) a control unit calculating a target value for the EGR ratio based upon engine operating parameters and controlling said EGR valve to maintain the EGR ratio at the calculated target value, said control unit, responsive to the check signal from said second sensor, for calculating an actual value for the EGR ratio based upon the output signals from said first and third sensors and correcting the calculated target EGR ratio value for the calculated actual EGR ratio value during engine idling, thereby reducing a deviation between the target and actual EGR ratio values to zero.

7. In automotive vehicle having a diesel engine including an intake passage provided therein with a throttle valve for controlling the rate of air flow to said engine, an exhaust passage provided therein with an emission control device, an EGR passage connected at its one end to said exhaust passage upstream of said emission control device and at the other end to said intake passage downstream of said throttle valve, said EGR passage having therein an EGR valve for controlling the rate of recirculated exhaust gas flow through said EGR passage, an EGR control system comprising:
 (a) a first sensor adapted to generate an output signal indicative of the rate of recirculated exhaust gas flow through said EGR passage;
 (b) a second sensor adapted to generate a check signal each time said vehicle travels a predetermined distance;
 (c) a third sensor adapted to generate an output signal indicative of the speed of rotation of said engine; and
 (d) a control unit calculating a target value for the EGR ratio based upon engine operating parameters and controlling said EGR valve to maintain the EGR ratio at the calculated target value, said control unit, responsive to the check signal from said second sensor, for calculating an actual value for the EGR ratio based upon the output signals from said first and third sensors and correcting the calculated target EGR ratio value for the calculated actual EGR ratio value during engine idling, thereby reducing a deviation between the target and actual EGR ratio values caused by exhaust gas pressure changes to zero.

8. The EGR control system of claim 6 or 7, wherein said control unit calculates the actual EGR ratio value and corrects the calculated target EGR ratio value for the calculated actual EGR ratio value when engine idling continues over a predetermined time.

9. The EGR control system of claim 1, 2, 6 or 7, wherein said control unit calculates a correction factor by dividing the calculated actual EGR ratio value by the calculated target EGR ratio value and corrects the calculated target EGR ratio value by multiplying the calculated correction factor by the calculated target EGR ratio value.

10. The EGR control system of claim 1, 2, 6 or 7, wherein said control unit corrects the target EGR ratio value by multiplying the target EGR ratio value by a result of repetitively subtracting a predetermined value from a predetermined correction factor when the target EGR ratio value is smaller than the actual EGR ratio value or a result of repetitively adding the predetermined value from the predetermined correction factor when the target EGR ratio value is greater than the actual EGR ratio value until the target EGR ratio value agrees with the actual EGR ratio value.

11. The EGR control system of claim 10, wherein the predetermined correction factor is 1 and the predetermined value is 0.01.

12. The EGR control system of claim 1, 2, 6 or 7, wherein said first sensor comprises:

a bypass passage connected at its inlet and outlet ends to said EGR passage at different position, said bypass passage having therein a venturi section;

a pair of change-over valves provided respectively at said bypass passage inlet and outlet ends, said change-over valves being movable between a first position separating said bypass passing from said EGR passage and a second position permitting substantially the whole amount of recirculated exhaust gases to flow through said bypass passage;

a pressure differential transducer adapted to generate an output signal indicative of the pressure differential existing across said venturi section; and means, responsive to a check signal from said second sensor for changing the change-over valve position from the first position to the second position.

* * * * *